Oct. 8, 1935.  T. L. GATKE  2,016,280
BRAKE BLOCK
Filed July 24, 1931
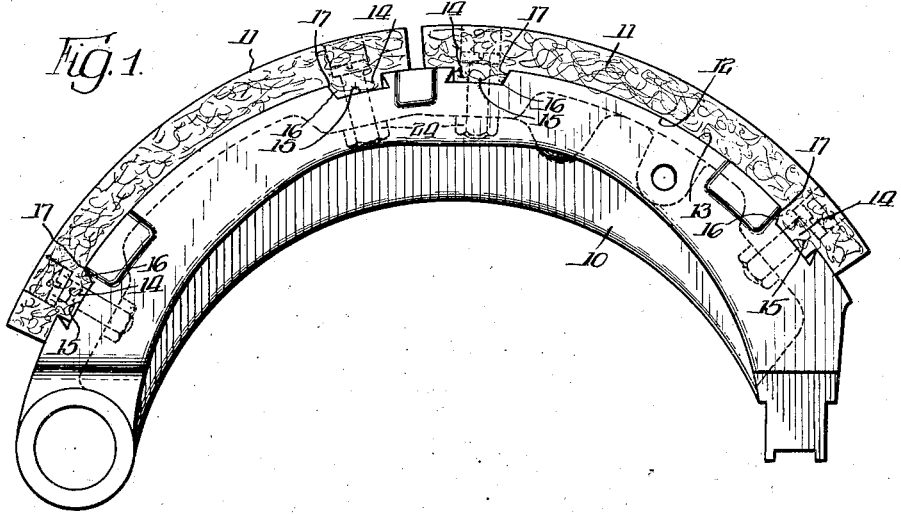
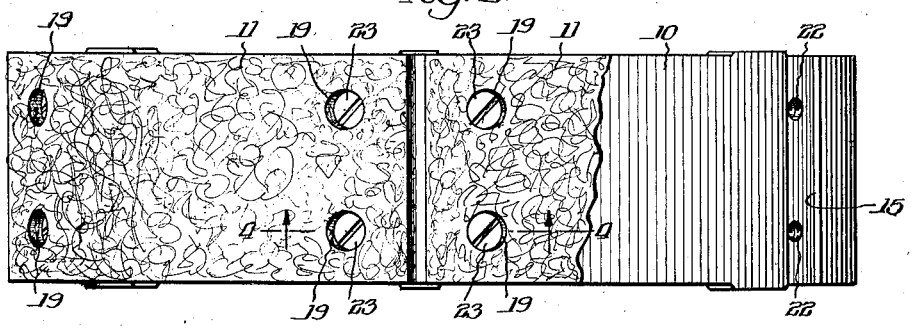
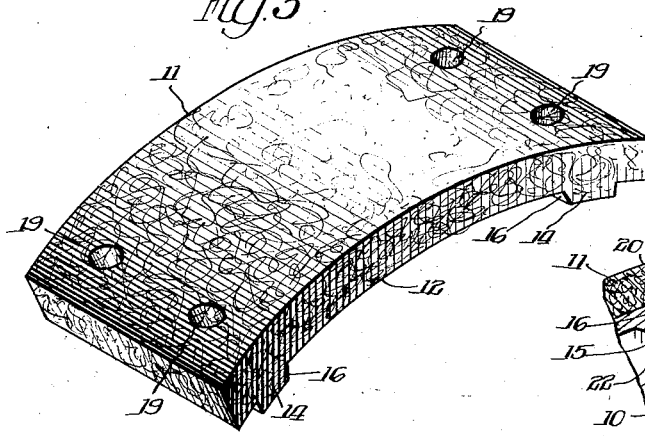
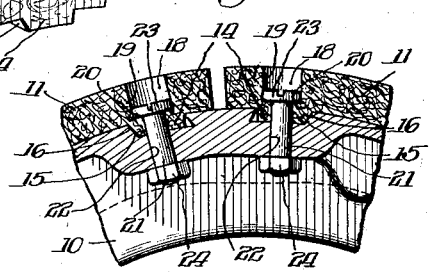
Inventor:
Thomas L. Gatke,
By Patented Oct. 8, 1935

2,016,280

UNITED STATES PATENT OFFICE 2,016,280

BRAKE BLOCK

Thomas L. Gatke, Oak Park, Ill.

Application July 24, 1931, Serial No. 552,917

1 Claim. (Cl. 188—234)

The present invention has to do with brake blocks of the large molded composition type used on the shoes of heavy duty brakes, and is particularly concerned with the manner in which such blocks are fastened to the shoes.

Prior to this invention, it had been the practice to fasten the blocks to the shoes by means of so-called keeper plates, which plates were bolted to the shoes, usually in recesses formed in the faces of the latter, and were provided with outwardly offset clamping lips which engaged with the ends of the shoes in overlapped relation to relieved portions of the latter. That arrangement, aside from requiring the employment of rather elaborate attaching means, did not permit full coverage of the shoes by the blocks since space had to be left at the ends of the blocks to accommodate the attaching means.

The principal object of the invention is to provide a brake block of improved design which may be fastened securely to the ordinary keeper-type shoe without the necessity of employing keeper plates at the ends of the block; which is extremely simple in construction, inexpensive to manufacture and easy to apply or remove; and which permits of substantially full coverage of the shoe without sacrificing either strength or security.

While the foregoing statements are indicative in a general way of the nature of the invention, other objects and advantages will be apparent to those skilled in the art upon a full understanding of the construction of the improved brake block.

One form of the invention is presented herein by way of exemplification, but it will of course be appreciated that the invention is susceptible of embodiment in other somewhat modified structural forms coming equally within the scope of the appended claim.

In the accompanying drawing:

Fig. 1 is a side view of a brake shoe on which two brake blocks are secured in accordance with the invention;

Fig. 2 is a face view of the shoe and blocks shown in Fig. 1, with one end of one of the blocks broken away for clearness;

Fig. 3 is a perspective view of one of the blocks; and

Fig. 4 is a fragmentary longitudinal section through the shoe and blocks, taken on the line 4—4 of Fig. 2.

The drawing shows a brake shoe 10 of ordinary construction, on which two brake blocks 11 are mounted. Since both of the blocks are the same, only one of them need be described in detail. As will be observed, the block 11 is of uniform width and thickness and is arcuate in shape as viewed from the side. It is molded out of a suitable friction composition and is made sufficiently hard and rigid to withstand the extremely high compressive forces to which it is subjected in service.

The block is intended to fit snugly against the shoe, with the curved back 12 of the block in contiguous engagement with a correspondingly curved seat 13 on the shoe. The block is provided on the back of the same with two cross ribs or lugs 14 which project into cross grooves 15 formed in the shoe. The ribs 14 are preferably located adjacent the ends of the block, and the confronting sides 16 of the ribs are preferably beveled in order to fit contiguously against the opposed sides 17 of the grooves and facilitate application and removal of the block. The sides 16 of the ribs on each block are disposed in planes which are nearly parallel to each other and each of said planes is normal to a plane which is tangential to the convex braking surface of the block at a point adjacent the opposite end of the latter. This arrangement provides a strong and solid anchorage for the blocks, in addition to the hereinafter hold-down means, regardless of the direction of rotation of the member being braked. The ribs 14 preferably bear snugly against the bottoms of the grooves and may be made slightly oversize and ground off to fit at the time of application.

At the locations of the ribs 14, the block is provided with bolt holes 18. The holes 18 extend not only through the block proper but through the additional thickness of the ribs 14 as well, and the outer ends of the holes 18 are counter-bored a substantial distance at 19 to provide deep annular seats 20.

The block 11 is secured to the shoe by means of bolts 21 which extend through the holes 18 into correspondingly located holes 22 in the shoe. The bolts 21 are provided with slotted heads 23 which bear against the seats 20 at the bottoms of the counterbored portions of the holes 18, and are provided at their opposite ends with nuts 24. The under sides of the heads 23 of the bolts are shown as flat, but they may be made conical, in which case the annular seats 20 will also be made conical. The bolts 21, when positioned and tightened up, clamp the block 11 snugly against the shoe 10, and the ribs 14 coact with the grooves 15 to resist endwise movement of the block on the shoe, thereby relieving the bolts 21 in large measure from the shearing stresses to which they would otherwise be subjected.

By providing the ribs 14 at the locations of the counterbored holes 18, the heads 23 of the attaching bolts 21 may be set in a substantial distance from the wearable friction face of the block without weakening the block at the points of attachment. The ribs 14, in addition to reinforcing the countersunk holes 18 for the bolts, also greatly strengthen the attaching connections by relieving the bolts from all shearing stresses.

I claim:

In a friction brake, the combination with a curved shoe having transverse grooves in its convex face adjacent its ends and other transverse grooves in said face adjacent its center, which latter grooves are separated by a short section of said face, of a pair of correspondingly curved friction blocks positioned contiguously against said face in overlying relation to the center grooves, with the adjacent ends of the blocks overlapping said center section in substantially end-to-end relation to each other, transverse ribs on the concave backs of said blocks extended into said grooves, and countersunk bolts for clamping the blocks to the shoe through apertures in said ribs.

THOMAS L. GATKE.